United States Patent [19]
Catlow

[11] Patent Number: 5,088,742
[45] Date of Patent: Feb. 18, 1992

[54] HYDRAULIC SEAL AND METHOD OF ASSEMBLY

[75] Inventor: Ronald Catlow, Derby, England

[73] Assignee: Rolls-Royce plc, London, England

[21] Appl. No.: 666,908

[22] Filed: Mar. 11, 1991

[30] Foreign Application Priority Data

Apr. 28, 1990 [GB] United Kingdom ............... 9009588

[51] Int. Cl.$^5$ ............................................. F01D 11/02
[52] U.S. Cl. ........................................ 277/56; 277/1;
277/9.5; 277/203; 415/173.5; 415/174.5;
29/434; 29/889.3
[58] Field of Search .................. 277/1, 9.5, 190, 203,
277/204, 216, 53-56; 415/170.1, 174.5, 173.5;
29/434, 889.3

[56] References Cited

U.S. PATENT DOCUMENTS

| | | |
|---|---|---|
| 899,319 | 9/1908 | Parsons et al. ............... 415/173.5 |
| 2,946,609 | 7/1960 | Comery ............................. 277/53 |
| 4,463,956 | 8/1984 | Malott ............................. 277/53 X |

FOREIGN PATENT DOCUMENTS 2117487 10/1983 United Kingdom .

*Primary Examiner*—William A. Cuchlinski, Jr.
*Assistant Examiner*—James K. Folker
*Attorney, Agent, or Firm*—Oliff & Berridge

[57] ABSTRACT

A radially inwardly extending annular flange (47) is integral with an annular portion (26) of an outer shaft (23). The annular flange (47) forms an oil weir in operation. A radially outwardly extending annular sealing member (56) is mounted on an annular portion (48,50) of an inner shaft (39). The shafts (23,39) are arranged to rotate relative to each other. The outer diameter of the sealing member (56) is greater than the inner diameter of the annular flange (47). In order to introduce or remove the sealing member (56) from the hydraulic seal, past the annular flange (47), the sealing member (56) is axially split by a circumferentially extending spiral to define axially overlapping portions (56A,56B). The sealing member (56) is parted axially to form a clearance and a portion of the annular flange (47) is located in the clearance. The sealing member (56) is rotated about its axis when the slope of the spiral is parallel to the annular flange (47).

12 Claims, 3 Drawing Sheets

HYDRAULIC SEAL AND METHOD OF ASSEMBLY

BACKGROUND OF THE INVENTION

1. Field of the Invention

The present invention relates to hydraulic seals between an outer rotating member and an inner member.

SUMMARY OF THE INVENTION

One known type of hydraulic seal between relatively rotating members comprises an annular flange which extends radially inwardly from an outer annular member to define a lubricant weir and an annular sealing member which extends radially outwardly from an inner annular member to define a lubricant seal. The outer diameter of the annular sealing member is greater than the inner diameter of the annular flange. In this known type of hydraulic seal, the outer annular member and the associated annular flange are fabricated around the inner annular member and its associated annular sealing member. However, these fabricated outer annular members and annular flanges suffer from leakage of lubricant through the joints.

In order to reduce or prevent leakage of lubricant from the outer annular member and annular flange the outer annular member and annular flange are formed integrally, and the outer annular member is machined to form the annular flange. The use of the integral outer annular member and annular flange introduces a problem of assembling the hydraulic seal, because it is not possible to introduce the annular sealing member past the annular flange.

Accordingly the present invention seeks to provide an hydraulic seal assembly in which a radially outwardly extending annular sealing member on an inner annular member may be introduced into the hydraulic seal assembly past a radially inwardly extending annular flange on an outer annular member.

Accordingly the present invention provides an hydraulic seal comprising an inner annular member and an outer annular member, the outer annular member being positioned coaxially around the inner annular member, at least the outer annular member being rotatable, the outer annular member having an integral annular flange extending radially inwardly to define, in operation, a lubricant weir, the inner annular member including an annular sealing member extending radially outwardly to define, in operation, a lubricant seal, the outer diameter of the annular sealing member being greater than the inner diameter of the annular flange, the annular sealing member is a spiral ring defining axially adjacent portions, means to bias the axially adjacent portions together, the axially adjacent portions are axially partable to allow the annular sealing member to be introduced into or removed from the hydraulic seal past the annular flange on the outer annular member.

The inner and outer annular members may be relatively rotatable.

The inner annular member may be rotatable.

The inner and outer annular members may be rotatable in the same direction.

Preferably the annular sealing member is resilient. Preferably the annular sealing member is arranged such that, in operation, lubricant is pumped from a low pressure side to a high pressure side of the annular sealing member through the helically extending spiral split. The annular sealing member may have a T-shaped cross-section. Preferably the inner annular member comprises an inner sleeve and an outer sleeve, the outer sleeve being slidably mounted coaxially on the inner sleeve, the inner sleeve and outer sleeve having cooperating ends arranged to define an annular slot to receive the annular sealing member. The opposite ends of the inner and outer sleeves may be secured together to retain the annular sealing member in the annular slot.

The present invention also provides a method of assembling an hydraulic seal comprising mounting a radially outwardly extending annular sealing member on an inner annular sleeve, the annular sealing member is a spiral ring defining axially adjacent portions, parting the axially adjacent portions of the annular sealing member to define an axial clearance between the adjacent portions, moving the inner annular sleeve and annular sealing member relative to an outer annular member and an inwardly extending flange such that a portion of the inwardly extending flange is positioned between the axially adjacent portions of the annular sealing member, rotating the inner annular sleeve and annular sealing member about the axis of the inner annular sleeve or rotating the outer annular member and annular flange about the axis of the outer annular member such that the whole of the annular sealing member is moved from one axial side to the opposite axial side of the inwardly extending annular flange. Preferably an outer annular sleeve is moved coaxially along the inner annular sleeve to locate the annular sealing member.

Preferably the axis of the inner annular sleeve is arranged at an angle with respect to the axis of the inwardly extending flange such that the slope of the spiral is parallel to the inwardly extending flange.

The present invention will be more fully described by way of example, with reference to the accompanying drawings, in which:

DESCRIPTION OF THE PREFERRED EMBODIMENT

Figure 1:
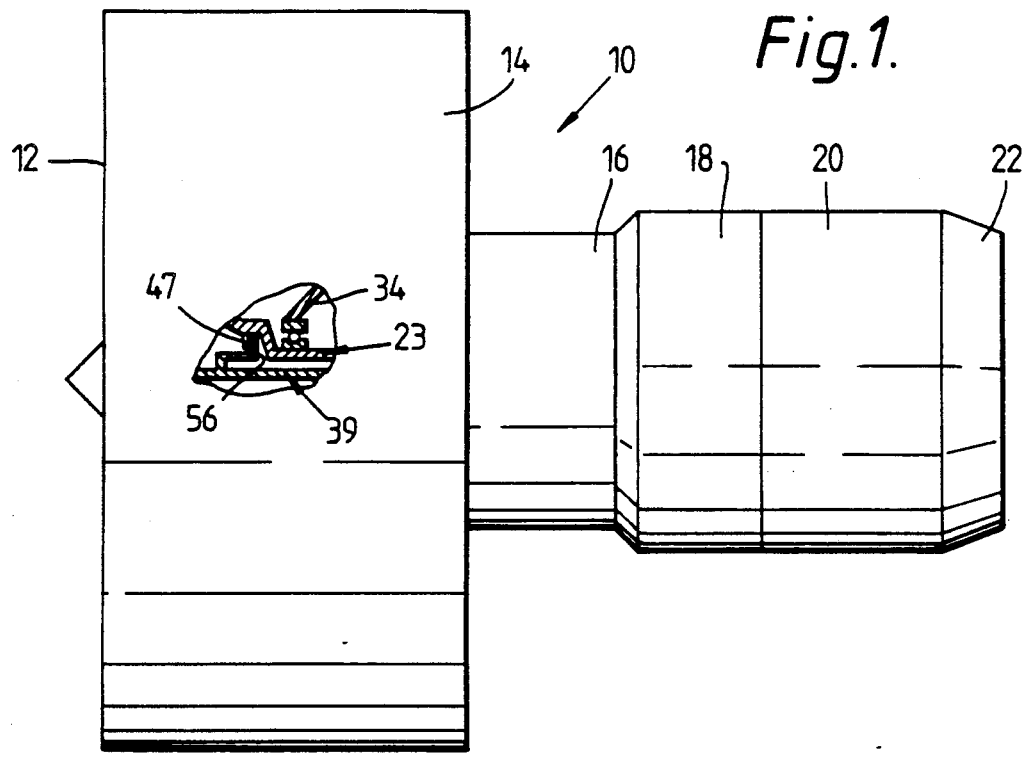
FIG. 1 is a partially cut-away view of a turbofan gas turbine engine showing an hydraulic seal according to the present invention.
Figure 3:
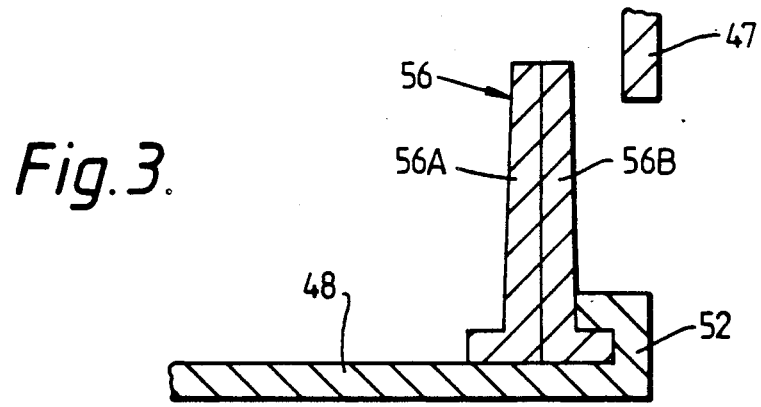
FIGS. 3 to 6 are longitudinal cross-sectional views to a further enlarged scale illustrating the assembling sequence for the hydraulic seal shown in FIGS. 1 and 2.
Figure 4:
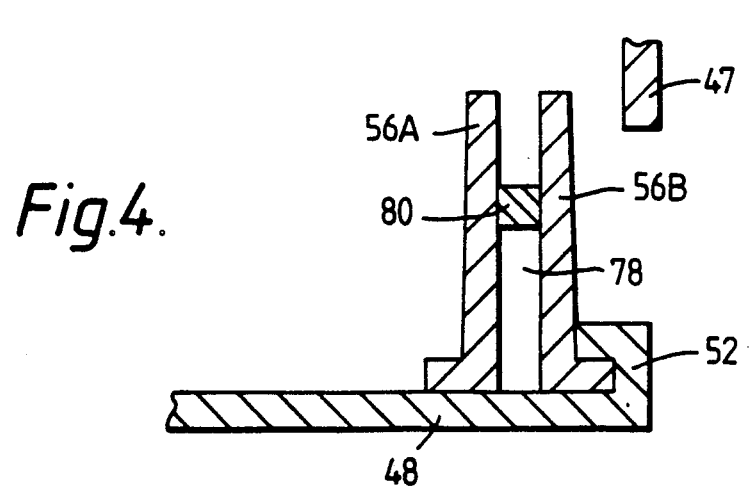
Figure 2:
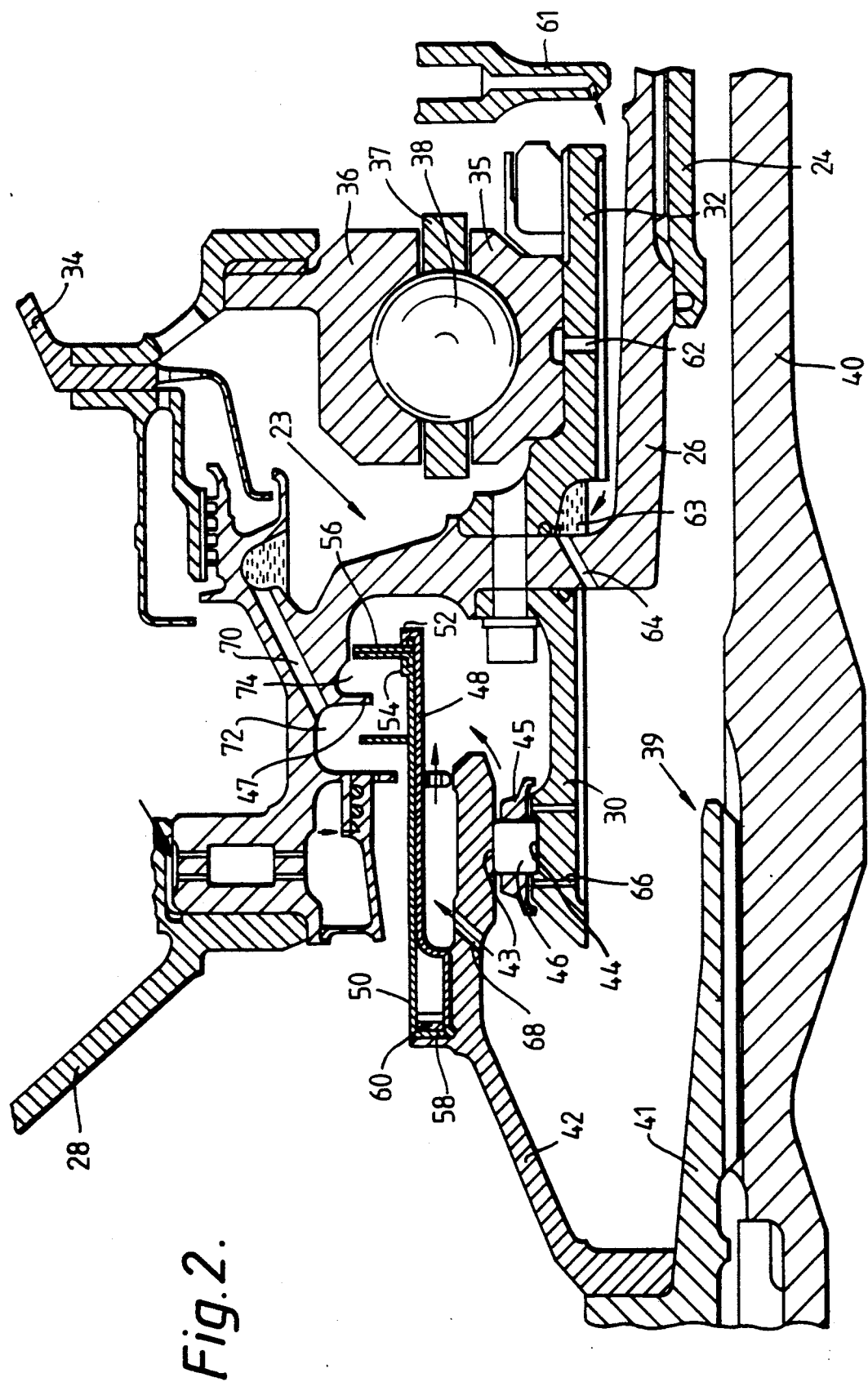
FIG. 2 is a longitudinal cross-sectional view to an enlarged scale through the hydraulic seal shown in FIG. 1.
Figure 5:
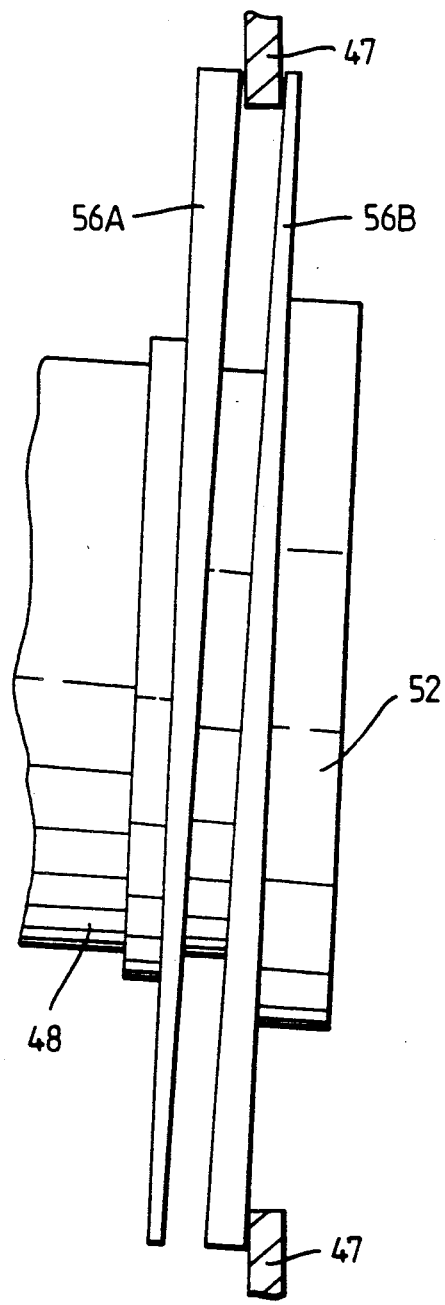
Figure 6:
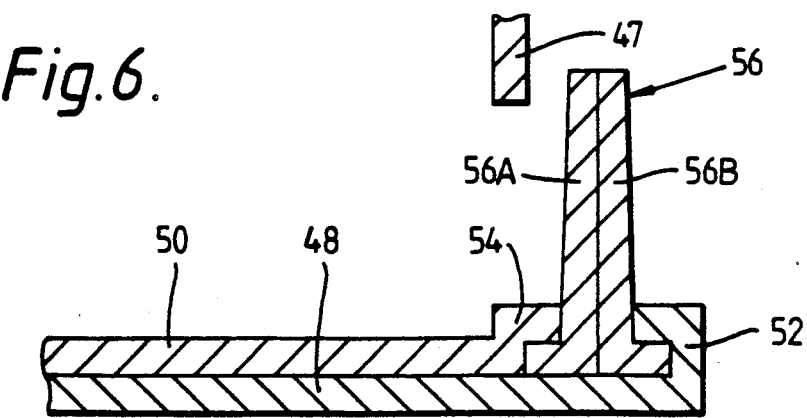

A turbofan gas turbine engine 10 is shown in FIG. 1, and comprises in axial flow series an inlet 12, a fan section 14, a compressor section 16, a combustion section 18, a turbine section 20 and an exhaust nozzle 22. The turbofan 10 operates quite conventionally and its operation will not be discussed further.

A cut-away portion of the turbofan 10 reveals an outer annular member 23 which forms a first rotor drive shaft and an inner annular member 39 which forms a second rotor drive shaft. The inner and outer annular members 39 and 23 are arranged coaxially and are arranged to be relatively rotatable.

The inner annular member 39 and the outer annular member 23 are arranged to rotate, but the outer annular member 23 is arranged to rotate at a higher speed than the inner annular member 39.

The outer annular member 23 comprises annular portions 24, 26 and 28 which are secured together by splined or bolted joints. Axially extending annular members 30 and 32 are secured to the annular portion 26 of the outer annular member 23 by a nut and bolt fastening. The axially extending annular member 32 carries an inner race 35 of a ball bearing and an outer race 36 of the ball bearing is carried by a static structure 34 positioned coaxially around the annular portion 26 and axially extending member 32. A plurality of balls 38, are located in a cage 37 and, are interposed between the inner and outer races 33 and 36, to rotatably mount the outer annular member 23 relative to the static structure 34.

The inner annular member 39 comprises annular portions 40, 41 and 42 which are secured together by splined or bolted joints. The annular portion 42 of the inner annular member 39 is arranged to be positioned radially between the axially extending member 30 and a region of the annular portion 26 of the outer annular member 23. The annular portion 42 of the inner annular member 39 has an outer race 43 of a roller bearing on its radially inner surface, and the axially extending member 30 has an inner race 44 of the roller bearing on its radially outer surface. A plurality of rollers 46, are located in a cage 45 and, are interposed between the inner and outer races 44 and 43 to rotatably mount the inner annular member 39 relative to the outer annular member 23.

The annular portion 26 has an integral radially inwardly extending annular flange 47 which is arranged to define an oil weir of the hydraulic seal. It is to be noted that the outer annular member 23 must rotate so that, in operation, oil collects at one side of the oil weir defined by the radially inwardly extending flange 47.

An inner annular sleeve 48 and an outer annular sleeve 50 are arranged coaxially with each other, and the inner diameter of the outer annular sleeve 50 is substantially the same as the outer diameter of the inner annular sleeve 48 to give a sliding fit. The inner annular sleeve 48 and outer annular sleeve 50 have flanges 52 and 54 respectively, at one end, which cooperate to form a T-shaped circumferentially extending slot in which a radially outwardly extending annular sealing member 56 of the hydraulic seal is located. The inner annular sleeve 48 and outer annular sleeve 50 also have flanges 58 and 60 respectively at their opposite ends which are secured to the annular portion 42 of the inner annular member 39.

The outer diameter of the annular sealing member 56 is greater than the inner diameter of the annular flange 47. The annular sealing member 56 has a helically extending split which defines axially adjacent and overlapping portions 56A and 56B. The adjacent portions 56A and 56B are parted axially to allow the annular sealing member 56 to be moved past the annular flange 47 to form a hydraulic seal. The annular sealing member 56 is resilient, and a tool is required to part the adjacent portions, but the adjacent portions return to a position adjacent each other when the tool is removed due to the resilience of the annular sealing member.

In operation an oil supply nozzle 61 is arranged to direct oil onto the inner surface of the axially extending annular member 32. A portion of the oil is supplied through apertures 62 in the axially extending annular member 32 to the inner and outer races 35 and 36 and balls 38 of the ball bearing. A further portion of the oil flows to an oil reservoir 63 defined by the axially extending annular member 32 and the annular portion 26.

Oil flows from the oil reservoir 63 through apertures 64 in the annular portion 26 onto the inner surface of the axially extending annular member 30. The oil then flows through apertures 66 in the axially extending annular member 30 to the inner and outer races 44 and 43 and rollers 46 of the roller bearing. The oil leaving the roller bearing is flung directly onto the inner annular sleeve 48 or flows through apertures 68 in the annular portion 42. The oil is then flung from the inner annular sleeve onto the inner surface of the annular portion 26 and collects behind the annular radially inwardly extending flange 47 in the region 74.

The annular sealing member 56 controls the flow of oil along the inner surface of the annular portion 26 in the region 74 to the annular flange 47. When the radial depth of oil behind the annular flange 47 in the region 74 is greater than the radial depth of the annular flange 47 the excess oil flows to a collecting chamber 72 and then through apertures 70 in the annular portion 26 to return to the oil supply.

The annular sealing member 56 is arranged such that, in operation, as the annular sealing member 56 rotates oil is pumped by the dynamic pressure from the low pressure side to the high pressure side of the annular sealing member 56 through the helically extending split. This is to counteract any tendency for the oil to flow from the high pressure side to the low pressure side of the annular sealing member 56 due to the pressure difference through the helically extending split. The inner and outer sleeves 48, 50 clamp the sealing member 56 to minimise the width of the split.

The procedure for assembling the hydraulic seal is illustrated in FIGS. 3, 4, 5 and 6 and initially the annular sealing member 56 is mounted on the inner annular sleeve 48 by locating the annular sealing member 56 at the flange 52. The axially adjacent portion 56A and 56B of the annular sealing member 56 are then parted axially to form a clearance 78 and an L-shaped tool bar 80 is introduced into the clearance 78. The inner annular sleeve 48 and the annular sealing member 56 are then arranged such that a portion of the annular flange 47 is positioned between the adjacent portions 56A and 56B of the annular sealing member 56. The axes of the inner annular sleeve 48 and the annular sealing member 56 are then arranged at an angle with respect to the axis of the annular flange 47 such that the slope of the spiral split in the annular sealing member 56 is parallel to the annular flange 47, e.g. perpendicular to the axis of the annular flange 47. The inner annular sleeve 48 and the annular sealing member 56 are then rotated about their axes, and moved axially so that the annular sealing member 56 passes the flange 47 and the whole of the annular sealing member 56 is eventually positioned at the opposite side of the flange 47. The axes of the inner annular sleeve 48 and the annular sealing member 56 are then arranged coaxially with the flange 47, the tool bar is removed and the outer annular sleeve 50 is slid coaxially onto the inner annular sleeve 48 to trap the annular sealing member 56 between the flanges 52 and 54. Finally the flanges 58, 60 at the opposite ends of the inner and outer annular sleeves 48 and 50 are secured to the annular portion 42 by a bolted connection.

The annular portion 42 is movable axially to be bolted to the inner and outer sleeves 48, 50 and once the nuts are removed the annular portion 42 may be removed from the engine whilst the hydraulic seal assembly remains intact and undisturbed.

The spiralling axially overlapping annular sealing member allows the hydraulic seal to be assembled and because it does not have axially extending split joints ensures that there is little lubricant leakage to ensure that lubricant collects behind the annular flange.

Although the description has referred to the inner and outer annular members 39 and 23 being relatively rotatable, it is essential that the outer annular member 23 rotates so that oil collects at one side of the oil weir to form the hydraulic seal. Therefore it is possible for the inner annular member 39 to remain static, or for the inner annular member 39 to rotate at a lower speed or a higher speed, in the same or the opposite direction, than the outer annular member 23. It is also possible for the outer and inner annular members 23 and 39 to rotate at the same speed in the same direction.

I claim:

1. A hydraulic seal comprising an inner annular member and an outer annular member, the outer annular member being positioned coaxially around the inner annular member, at least the outer annular member being rotatable, the outer annular member having an integral annular flange extending radially inwardly to define in operation, a lubricant weir, the inner annular member including an annular sealing member extending radially outwardly to define, in operation, a lubricant seal, the outer diameter of the annular sealing member being greater than the inner diameter of the annular flange, the annular sealing member is a spiral ring defining axially adjacent portions, means to bias the axially adjacent portions of the spiral ring together, the axially adjacent portions of the spiral ring are axially partable to allow the annular sealing member to be introduced into or removed from the hydraulic seal past the annular flange on the outer annular member.

2. A hydraulic seal as claimed in claim 1 in which the inner and outer annular members are relatively rotatable.

3. A hydraulic seal as claimed in claim 2 in which the inner annular member is rotatable.

4. A hydraulic seal as claimed in claim 3 in which the inner and outer annular members are rotatable in the same direction.

5. A hydraulic seal as claimed in claim 1 in which the annular sealing member is resilient.

6. A hydraulic seal as claimed in claim 1 in which a helically extending spiral split is formed between the axially adjacent portions of the spiral ring, the annular sealing member has, in operation, a low pressure side and a high pressure side, the annular sealing member is arranged such that, in operation, lubricant is pumped from the low pressure side to the high pressure side of the annular sealing member through the helically extending spiral split.

7. A hydraulic seal as claimed in claim 1 in which the annular sealing member is substantially T-shaped in cross-section.

8. A hydraulic seal as claimed in claim 1 in which the inner annular member comprises an inner sleeve and an outer sleeve, the outer sleeve being slidably mounted coaxially on the inner sleeve, the inner sleeve and outer sleeve having cooperating ends arranged to define an annular slot to receive the annular sealing member.

9. A hydraulic seal as claimed in claim 8 in which the opposite ends of the inner and outer sleeves are secured together to retain the annular sealing member in the annular slot.

10. A method of assembling a hydraulic seal comprising the steps of: mounting a radially outwardly extending annular sealing member on an inner annular sleeve, the inner annular sleeve having an axis, wherein the annular sealing member is a spiral ring defining axially adjacent portions, the axially adjacent portions of the spiral ring are biased together; parting the axially adjacent portions of the annular sealing member against the bias to define an axial clearance between the adjacent portions; moving the inner annular sleeve and annular sealing member relative to an outer annular member and an inwardly extending annular flange such that a portion of the inwardly extending annular flange is positioned between the axially adjacent portions of the annular sealing member, the outer annular member having an axis, the annular flange having a first axial side and a second axial side; and rotating the inner annular sleeve and annular sealing member about the axis of the inner annular sleeve or rotating the outer annular member and annular flange about the axis of the outer annular member such that the annular sealing member is moved from the first axial side to the second axial side of the inwardly extending annular flange.

11. A method as claimed in claim 10 in which an outer annular sleeve is moved coaxially along the inner annular sleeve to locate the annular sealing member.

12. A method as claimed in claim 10 in which a helically extending spiral split is formed between the axially adjacent portions of the spiral ring, the helically extending spiral split has a slope, the inner annular sleeve is arranged at an angle with respect to the axis of the outer annular member such that the slope of the spiral is parallel to the inwardly extending flange.

* * * * *